United States Patent [19]
Miller

[11] Patent Number: 6,022,578
[45] Date of Patent: Feb. 8, 2000

[54] TABLESPREAD PRODUCT CONTAINING LIQUID FAT AND PROCESS FOR PREPARING SAME

[75] Inventor: Miranda Miller, Arlington Heights, Ill.

[73] Assignee: Kraft Foods, Inc., Northfield, Ill.

[21] Appl. No.: 08/970,250

[22] Filed: Nov. 13, 1997

Related U.S. Application Data

[63] Continuation of application No. 08/709,837, Sep. 10, 1996, abandoned, which is a continuation-in-part of application No. 08/511,837, Jul. 7, 1995, abandoned, which is a continuation of application No. 08/231,037, Apr. 22, 1994, abandoned.

[51] Int. Cl.[7] ................................. A23D 9/007
[52] U.S. Cl. ................. 426/603; 426/611; 426/804; 426/604
[58] Field of Search .................. 426/804, 611, 426/603, 604

[56] References Cited

U.S. PATENT DOCUMENTS

| | | | |
|---|---|---|---|
| 3,519,436 | 7/1970 | Bauer . | |
| 5,017,398 | 5/1991 | Jandacek | 426/611 |
| 5,039,544 | 8/1991 | Lansbergen | 426/611 |
| 5,064,677 | 11/1991 | Cain et al. | 426/611 |
| 5,338,564 | 8/1994 | Meyer | 426/611 |
| 5,366,753 | 11/1994 | Meyer | 426/611 |
| 5,472,728 | 12/1995 | Miller | 426/611 |

FOREIGN PATENT DOCUMENTS

4716189  6/1990  Australia .

*Primary Examiner*—Carolyn Paden
*Attorney, Agent, or Firm*—Fitch, Even, Tabin & Flannery

[57] ABSTRACT

It is an object of the present invention to provide edible fat-containing products comprising liquid and indigestible polyol fatty acid polyesters which products are characterized by having good thermal stability, oral response and storage temperature cycle stability.

26 Claims, No Drawings

TABLESPREAD PRODUCT CONTAINING LIQUID FAT AND PROCESS FOR PREPARING SAME

This application is a continuation, of application Ser. No. 08/709,837, filed Sep. 10, 1996 now abandoned, which is a continuation-in-part of application Ser. No. 08/511,837, filed Jul. 7, 1995, now abandoned which is a continuation of application Ser. No. 08/231,037, filed Apr. 22, 1994, now abandoned.

FIELD OF THE INVENTION

The present invention relates to fat-containing products comprising a liquid fat and a wax. In particular, the present invention relates to edible fat-containing products of the emulsion type, such as margarines and other tablespreads. The invention further relates to processes for the preparation of such products.

BACKGROUND OF THE INVENTION

The use of liquid triglyceride fats to replace solid fats is highly desirable in that the liquid fats contain a substantial level of unsaturated and polyunsaturated fatty acids. The preparation of a margarine-type tablespread from liquid triglyceride fats is highly desirable. More particularly, it would be most desirable to replace the usual triglyceride fats used in the preparation of margarine-type tablespreads with a non-digestible liquid fat such as polyol fatty acid polyesters.

Polyol fatty acid polyesters, and in particular, the sugar fatty acid polyesters, such as, e.g., the sucrose fatty acid polyesters, are known as suitable low calorie fat replacers in edible products. Substantially indigestible for human beings, they have physical and organoleptic properties very similar to triglyceride oils and fats conventionally used in edible products. Polyol fatty acid polyesters are also reported to have use as pharmaceutical agents, e.g., in view of their ability to take up fat soluble substances such as in particular, cholesterol, in the gastrointestinal tract, and subsequently removes those substances from the human body. Accordingly, it is attractive to replace at least part of the fat in edible fat-containing products by polyol fatty acid polyesters.

It is further reported that in food products the use of polyol fatty acid polyesters which are liquid at body temperature, may give rise to the so-called problem of anal leakage. Accordingly, it is particularly attractive to replace the more solid part (hardstock) of the fat by counterpart polyol fatty acid polyesters.

In this specification, unless otherwise indicated, the term "fat" refers to edible fatty substances in a general sense, including natural or synthesized fats and oils consisting essentially of triglycerides such as, for examples, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example, waxes, e.g., jojoba oil and hydrogenated jojoba oil and polyol fatty acid polyesters referred to hereinafter in more detail. The terms fat and oil are used interchangeably.

In this specification, the term "polyol" is intended to refer to any aliphatic or aromatic compound which comprises at least four free hydroxyl groups. Such polyols in particular include the group of sugar polyols, which comprise the sugars, i.e., the mono-, di- and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used sugar polyol in sucrose.

In this specification, the term "polyol fatty acid polyester" is intended to refer to any such polyesters or mixtures thereof, of which, on an average, more than 70% of the polyol hydroxyl groups have been esterified with fatty acids.

In this specification, by "indigestible" is meant that at least about 70% by weight of the material concerned is not digested by the human body.

In this specification, by "hardstock" is meant that part of the fat composition characterized by a slip melting point of above 36° C. "Slip melting point" is defined as the temperature at which the amount of solid phase in the melting fat has become to low that an air bubble is forced upwards in an open capillary filled with the fat.

Fat-containing products and in particular, emulsion-type products such as margarines and low-fat spreads, have to comply with requirements such as oral response, thermal stability, cycle stability, spreadability, melting behavior and the like. Often they have to comply with such requirement simultaneously.

In particular, for margarines and low-fat spreads which contain relatively large amounts of polyunsaturated components, or require increased softness at lower (refrigerator) temperatures, it can be difficult to simultaneously comply with the requirements for cycle stability, thermal stability and acceptable taste properties.

Stability against temperature changes (cycle stability) is important in view of temperature changes during transport and storage as well as temperature changes which may frequently occur during household use. Improved storage temperature cycle stability is therefor advantageous, if not essential.

Heat stability, i.e., stability in terms of the absence of phase separation and of oil exudation, determines the ambient temperatures at which the product can be used. It will be clear that heat stability requirements are dependent of the climatic zone involved.

In general, the heat stability is governed by the amount of hardstock, i.e., the amount of higher melting fats. A better heat stability, however, in general will result in a deterioration of the oral response, especially after temperature cycling. This is because the oral response largely depends on the melting behavior of the fat phase.

Although not wishing to be bound by theory, it is believed that the difficult compatability of heat stability, good oral response and cycling stability stems from the fact that good heat stability (e.g., heat stability at 30° C. for 24 hours) generally requires fat blend compositions containing relatively high amounts of higher melting fat fractions such as in particular, fat fractions having melting points above mouth temperature. These higher melting fat fractions are believed to be responsible for the adverse effects on oral response and cycling stability.

SUMMARY OF THE INVENTION

It is an object of the present invention to provide edible fat-containing products comprising liquid and indigestible polyol fatty acid polyesters which products are characterized by having good thermal stability, oral response and storage temperature cycle stability.

It has been found that various waxes can be used to stabilize liquid fats to provide margarine-type tablespread products. As used herein, the term "liquid fat" means triglyceride fats and polyol fatty acid polyesters which are liquid at normal ambient temperature, i.e., are liquid at temperatures above about 60° F.

In a further aspect of the invention, there is provided a process for the preparation of margarine-type edible fat-containing products which are prepared from liquid fats by a process wherein a mixture of the liquid fat and a wax are heated to a temperature above the melting point of the wax, the mixture is cooled to an intermediate temperature which is between ambient temperature and the melting point of the wax under conditions of agitation and the mixture is further cooled to a temperature below ambient temperature under quiescent cooling conditions.

DETAILED DESCRIPTION OF THE INVENTION

The present invention is directed to an edible fat-containing product having the textural characteristics of a margarine-type tablespread. The edible-fat containing food product of the invention comprises a major amount of a liquid fat and a minor amount of an edible wax.

The term "wax" usually refers to a substance that is a plastic solid at ambient temperature and, on being subjected to moderately elevated temperatures, becomes a low viscosity liquid. Because it is plastic, wax usually deforms under pressure without the application of heat. The chemical composition of natural waxes is complex. Waxes usually contain a broad variety of molecular weight species and reactive functional groups. Some classes of mineral and synthetic waxes, however, are totally hydrocarbon compounds. Waxes which can be used in the method and compositions of the present invention may be selected from the group consisting of insect wax, such as beeswax, vegetable waxes, such as carnauba wax, and animal waxes, such as spermaceti wax. Petroleum waxes and synthetic waxes may also be utilized. More particularly, the present invention utilizes a natural wax selected from the group consisting of beeswax, candeilla wax, carnauba wax, japan wax, ouricury wax, jojoba wax and bayberry wax.

The liquid fat used in the edible fat-containing food product of the invention may be triglyceride fats, such as corn oil, cottonseed oil, olive oil, peanut oil, canola oil, rapeseed oil, safflower oil, soybean oil and sunflower oil. While liquid fats are usually described by the use of the term "oil", the term "liquid fat" and "liquid oil" is used interchangeably in the description of the present invention. The triglyceride liquid fat can be replaced in whole or in part with a liquid polyol fatty acid polyester.

A wide variety of non-digestible fatty materials are suitable for use in the fatty compositions of the present invention. Depending on their melting point, they can be used as a liquid fatty material or as a solid fatty material, or both, in the compositions of the invention. Examples of such non-digestible fatty materials are: fatty alcohol esters of polycarboxylic acids (U.S. Pat. No. 4,508,746); fatty polyesters of polyglycerol (U.S. Pat. No. 3,932,532); (food use disclosed in German Pat. No. 207,070); ethers and ether-esters of polyols containing the neopentyl moiety (U.S. Pat. No. 2,962,419); fatty alcohol diesters of dicarboxylic acids such as malonic and succinic acid (U.S. Pat. No. 4,583,927); triglyceride esters of alpha branched chain-alkyl carboxylic acids (U.S. Pat. No. 3,579,548); and sugar and sugar alcohol fatty acid polyesters (U.S. Pat. No. 3,600,186); all incorporated herein by reference. The fatty moieties of these materials typically contain from about 8 to about 24 carbon atoms, preferably from about 14 to about 18 carbon atoms.

For reasons of cost efficiency, consumer acceptability and assurance of inherent safety, the preferred class of such materials to be used in the fatty composition of the present invention is polyol fatty acid polyesters. Polyol fatty acid polyesters comprise sugar fatty acid polyesters, sugar alcohol fatty acid polyesters, polyglycerol fatty acid polyesters and mixtures thereof.

Sugar, sugar alcohol, or polyglycerol fatty acid polyesters are among the preferred materials for use in the present invention. The term "sugar" is used herein in its conventional sense as generic to mono- and disaccharides. The term "sugar alcohol" is likewise used in its conventional sense as generic to the reduction product of sugars wherein the aldehyde or ketone group has been reduced to an alcohol. The term "polyglycerol" is used to describe mixtures of ethers or glycerol with itself, ranging from 2 to 30 glycerol units per molecule. Polyglycerol is prepared by polymerization of glycerol in the presence of either acid or base with the removal of water during reaction. For example, the synthesis described in U.S. Pat. No. 3,968,169 is suitable and is incorporated by reference herein. Polyglycerol can be fractionated by methods known in the art, such as molecular distillation, to give specific polymer ranges.

The polyol polyester compounds suitable for use as the fatty materials herein are prepared by reacting a monosaccharide, disaccharide, sugar alcohol or polyglycerol with such fatty acids as will be disclosed herein. Preferred monosaccharides, disaccharides and sugar alcohols contain 4 to 8 hydroxyl groups. Preferred polyglycerols contain predominantly about 5 to about 15, and more preferably about 6 to about 10, etherified glycerol units.

Examples of suitable monosaccharides are those containing 4 hydroxyl groups such as xylose, arabinose and ribose; the sugar alcohol derived from xylose, i.e., xylitol, is likewise suitable. The monosaccharide erythrose is not suitable for use in the fatty materials of the fatty composition of the present invention since it only contains 3 hydroxyl groups; however, the sugar alcohol is derived from erythrose, i.e., aliphatic terminal monocarboxylic acids, having from about 2 to about 24, preferably from about 8 to about 24, most preferably from 14 to 18 carbon atoms. The fatty acids can be derived from suitable or naturally occurring or synthetic fatty acids and can be saturated or unsaturated, including positional and geometric isomers. Examples of such fatty acids are caprylic, capric, lauric, myristic, myristoleic, palmitic, palmitoleic, stearic, oleic, elaidic, ricinoleic, linoleic, linolenic, eleostearic, arachidic, behenic, erucic and brassidic. The sugar, sugar alcohol or polyglycerol esters will be liquids or solids depending upon the particular combination of polyol and esterifying acids, as well as the degree of esterification.

Fatty acids per se or naturally occurring fats and oils can serve as the source for the fatty acid component in the sugar, sugar alcohol or polyglycerol fatty acid ester. For example, rapeseed oil provides a good source of $C_{22}$ fatty acid, while $C_{16}$–$C_{18}$ fatty acids can be provided by tallow, soybean oil, palm oil or cottonseed oil. Shorter chain fatty acids can be provided by coconut, palm kernel or babassu oils. Corn oil, lard, canola, olive oil, peanut oil, safflower seed oil, sesame seed oil and sunflower seed oil are examples of other natural oils which can serve as the source of the fatty acid component.

Sugar, sugar alcohol or polyglycerol fatty acid polyesters suitable for use as the fatty material in the fatty composition of the present invention described herein can be prepared by a variety of methods known to those skilled in the art. These methods include, for example, transesterification of the polyol with methyl, ethyl or glycerol fatty acid esters using a variety of catalysts; acylation of the polyol with a fatty acid anhydride; and acylation of the polyol with a fatty acid, per se. Polyol polyesters; their use as fat substitutes, and their preparations are described in detail in the following U.S. Patents, all incorporated herein by reference; U.S. Pat. Nos. 3,600,186; 4,034,083; 2,831,854; 3,963,699; 4,518,772; 4,517,360 and 3,968,169.

A characterizing feature of the sugar or sugar alcohol fatty acid polyesters useful in the fatty composition of this invention that they predominantly contain at least 4 fatty acid ester groups. Sugar or sugar alcohol fatty acid polyester compounds that contain 3 or less fatty acid ester groups are digested in the intestinal tract much in the same manner as ordinary triglyceride fats, but sugar or sugar alcohol fatty acid polyester compounds that contain four or more fatty acid ester groups are digested to a lesser extent, or not at all. It is not necessary that all of the hydroxyl groups of the sugar or sugar alcohol fatty acid polyester be esterified with fatty acids, but it is preferable that the sugar or sugar alcohol fatty acid polyester contain no more than three unesterified hydroxyl groups, more preferable that it contain no more than two, and most preferable that substantially all of the hydroxyl groups of the sugar or sugar alcohol fatty acid polyester is esterified with fatty acid. Therefore, sugar or sugar alcohol fatty acid polyesters are preferred materials for use in the present invention as both the liquid and solid fatty materials because, by being substantially nondigestible, they are absorbed to a very low extent, or not at all, and result in a reduced or non-caloric fatty composition.

A characterizing feature of the polyglycerol fatty acid polyesters useful in this invention is that they predominantly contain at least 5, preferably from about 5 to about 15, and most preferably from about 6 to about 10, etherified glycerol units. In addition, polyglycerol fatty acid polyesters useful in this invention should have at least 75%, and preferably at least 85%, of their hydroxyl groups esterified with fatty acids. Polyglycerol fatty acid polyester compounds that contain 3 or less etherified glycerol units are digested, absorbed and metabolized much in the same manner as ordinary triglyceride fats, but polyglycerol fatty acid polyester compounds that contain 5 or more etherified glycerol units are digested, absorbed and metabolized to a much lesser extent, or not at all. Therefore, polyglycerol fatty acid polyesters are also preferred materials for use in the present invention as both the liquid and solid fatty materials because, by being substantially non-digestible, they are absorbed to a lesser extent, or not at all, and result in a reduced or non-caloric fatty composition.

The above described fatty materials may exist in solid or liquid form at body temperature, i.e., at 37° C. (98.6° F.), depending upon their particular polyol and fatty acid compositions. Discussed hereinbelow are certain preferred solid and liquid fatty materials for use in the improved fatty composition of the present invention.

In the method of the invention, a mixture of a major amount of the liquid fat and a minor amount of a wax is prepared. The mixture generally contains from about 93% to about 98.5% of the liquid fat and from about 1.5% to about 6.0% of the wax. The mixture of liquid fat and wax provides the oil phase of the edible fat-containing compositions of the invention. The oil phase also generally includes emulsifiers, flavoring agents and vitamins. Emulsifiers useful in the present invention include lecithin, mono and diglycerides, various esters of monoglycerides, including lactic, citric, and acetic acids and polysorbate esters. The oil phase, including the liquid fat and the wax, is heated to a temperature sufficiently high to melt the wax. In general, the wax will have a melting point in the range of from about 100° F. to about 190° F.

An aqueous dispersion is then prepared which includes water, milk protein, salt and may include preservatives, such as potassium sorbate. The aqueous dispersion generally includes from about 70% to about 90% water and from about 1% to about 10% milk protein. The milk protein is preferably non-fat dry milk, but whey protein can also be used.

The aqueous phase is added to the heated oil phase. In general, from about 3 parts to about 5 parts of the oil phase are used per part of the aqueous phase. The aqueous phase and the heated oil phase are stirred together to provide a preemulsion.

The preemulsion is cooled with agitation in a suitable device, such as a scraped surface heat exchanger to a temperature which is intermediate between ambient temperature and the melting point temperature of the wax. Preferably, this temperature is in the range of from about 70° F. to about 120° F.

It has been determined that the mixture of the aqueous phase and the oil phase cannot be cooled to a temperature below about 100° F. without causing the structure of the wax to break down by the shear imposed at low temperatures. It has been determined that a second stage of cooling must be used wherein the water-in-oil emulsion is cooled quiescently after first being cooled to the intermediate temperature with agitation.

The following examples further illustrate various features of the invention, but are intended to in no way limit the scope of the invention as set forth in the appended claims.

EXAMPLE 1

An aqueous phase was prepared having the following components at the indicated level:

| Component | Weight % |
| --- | --- |
| Non-fat dry milk | 8.25 |
| Salt | 8.75 |
| Potassium sorbate | 0.50 |
| Water | 82.50 |

A separate fat phase was prepared by heating a mixture containing the following components to a temperature of 160° F. to melt the wax:

| Component | Weight % |
| --- | --- |
| Soybean oil | 96.30 |
| Beeswax | 3.125 |
| Lecithin | 0.275 |
| Mono/diglycerides | 0.225 |
| Flavor | 0.050 |
| Beta carotene | 0.025 |

To 400 grams of the heated oil phase at a temperature of 160° F. was added 100 grams of the aqueous phase. The heated mixture was maintained in a jacketed beaker provided with a cooling liquid in the jacket. The mixture was stirred as it cooled to a temperature of 120° F. Half of the mixture was then poured into a margarine tub and placed in a refrigerator to cool. The remaining half of the mixture was stirred until the temperature reached 105° F. This half of the mixture was poured into a margarine tub and placed in the refrigerator to cool.

The half of the mixture which was cooled to 120° F. and then quiescently cooled was firm and waxy on the top. It had not hardened enough to stabilize the emulsion before refrigeration. The half of the mixture which was cooled with agitation to 105° F. before quiescent cooling was firm and not as waxy. It had a slight translucence, but it had a margarine-type tablespread mixture.

EXAMPLE 2

A tablespread product of the present invention was prepared in which triglyceride oil was replaced with liquid sucrose fatty acid polyester. In addition, an oil-in-water emulsion containing a solid sucrose fatty acid polyester was incorporated into the continuous sucrose polyester and wax phase. The inclusion of the oil-in-water emulsion reduced the waxy translucency of the tablespread, and helped provide a smoother texture.

The steps in making this product were very similar to those presented in Example 1. An aqueous phase was prepared with the following composition:

| Component | Weight % |
| --- | --- |
| Water | 82.92 |
| Non-fat dry milk | 8.29 |
| Salt | 8.29 |
| Potassium sorbate | 0.50 |
| Total | 100.00 |

An oleaginous phase was prepared using a liquid sucrose fatty acid polyester which had been previously prepared with fatty acyl groups derived from soybean oil. The following ingredients were heated together to 165° F. to affect complete melting and blending of all components:

| Component | Weight % |
| --- | --- |
| Liquid sucrose polyester | 93.10 |
| Beeswax | 6.25 |
| Lecithin | 0.275 |
| Mono/diglyceride | 0.225 |
| Flavor | 0.125 |
| Beta-carotene | 0.025 |
| Total | 100.00 |

A 200 gram portion of the oleaginous phase was transferred to a jacketed beaker which was heated to 165° F. While the mixture was being stirred with an overhead stirrer, 50 grams of the aqueous phase was slowly added. When the mixture appeared homogeneous, the temperature of the jacketed beaker was reduced to 120° F. while the product was continuously stirred.

When the temperature of the product reached 120° F., an 80 gram portion of an oil-in-water viscous dressing was dispersed in the mixture. The dressing contained sucrose fatty acid polyester in place of triglyceride fat. Unlike the oleaginous phase, the sucrose polyester in the oil-in-water emulsion was one which was a solid at room temperature, and which maintained a portion of its solid fat content at body temperature. The composition of the oil-in-water emulsion was as follows:

| Component | Weight % |
| --- | --- |
| Water | 52.85 |
| Solid sucrose polyester | 29.88 |
| Sugar | 4.66 |
| Salted whole egg mix | 4.21 |
| Starch | 4.02 |
| Vinegar | 2.69 |
| Egg yolk | 0.85 |
| Lactic acid | 0.49 |
| Xanthan gum | 0.20 |
| Salt | 0.15 |
| Total | 100.00 |

Following incorporation of the oil-in-water emulsion, the product was cooled with stirring to 105° F. Half of the product was transferred to a margarine tub and cooled quiescently to 40° F. (Sample A). The other half was cooled with stirring to 75° F. before transferring to a margarine tube for quiescent cooling to 40° F. (Sample B).

The composition of the final combined product was as follows:

| Component | Weight % |
| --- | --- |
| Liquid sucrose polyester | 56.424 |
| Water | 25.373 |
| Solid sucrose polyester | 7.242 |
| Beeswax | 3.788 |
| Salt | 1.294 |
| Non-fat dry milk | 1.258 |
| Sugar | 1.130 |
| Salted whole egg | 1.021 |
| Starch | 0.976 |
| Vinegar | 0.655 |
| Egg yolk | 0.206 |
| Lecithin | 0.166 |
| Mono/diglycerides | 0.136 |
| Lactic acid | 0.121 |
| Flavor | 0.076 |
| Potassium sorbate | 0.076 |
| Xanthan gum | 0.048 |
| Beta-carotene | 0.015 |
| Total | 100.00 |

Both Sample A and Sample B were acceptable tablespread products. The inclusion of the oil-in-water emulsion added opacity to the products, and thus were less waxy looking than the product of Example 1. Both samples had rapid melt properties in the mouth, with no waxy mouthfeel.

The firmness and spreadability of the products were determined using a cone penetrometer at several temperatures. A 60° cone was used to penetrate to a total depth of 5 mm. The values were compared with a commercial soft tub margarine and a harder stick margarine.

| | Penetrometer Firmness (grams) | | |
| --- | --- | --- | --- |
| Product | 40° F. | 50° F. | 60° F. |
| Sample A | 71.5 + 3.6 | 45.6 + 4.5 | 15.0 + 3.4 |
| Sample B | 49.5 + 2.6 | 12.4 + 1.5 | 4.4 + 1.1 |

-continued

|  | Refrigerated | Room Temperature |
| --- | --- | --- |
| Tub Margarine | 33.6 + 2.8 | 10.7 + 0.9 |
| Stick Margarine | 127 + 4.1 | 30.9 + 1.8 |

These results indicate that the firmness and spreadability of Sample A is between that of tub and stick margarine at refrigerator temperatures, but approaches that of the softer tub margarine when warmed to room temperature. Sample B is similar to soft margarine in the refrigerator, but is softer when warmed up to room temperature. The final firmness of the product can be controlled by the amount of shear it receives during cooling.

Photomicrographs taken of this product clearly show the wax crystals in the continuous oleaginous phase and surrounding the dispersed aqueous particles.

What is claimed is:

1. An edible fat-containing product having the textural characteristics of a margarine-type tablespread which is a stable homogeneous blend comprising an aqueous dispersion and an oil phase wherein said oil phase comprises about 92% to about 98.5% of a liquid fat which is liquid at about 60° F. and about 1.5% to about 8% of a wax, wherein said liquid fat consists of polyol fatty acid polyesters which are selected from the group consisting of sugar fatty acid esters and sugar alcohol fatty acid esters having at least five fatty acid ester groups, wherein said edible fat-containing product is prepared by a process comprising:
   (a) providing a mixture of said liquid fat and said wax, said mixture having from about 92% to about 98.5% of said liquid fat and from about 1.5% to about 8% of said wax;
   (b) heating said mixture with agitation to a temperature sufficient to melt said wax and to provide a homogeneous oil phase of said liquid fat and said wax;
   (c) adding said aqueous dispersion to said heated oil phase, said aqueous dispersion being added at a level of one part of said aqueous dispersion to from about 3 parts to about 5 parts of said oil phase to form a homogeneous blend;
   (d) first cooling said homogeneous blend under low shear agitation to a temperature intermediate between ambient temperature and the melting temperature of said wax; and
   (e) further cooling the homogeneous blend to refrigeration temperature under quiescent conditions;
   whereby the structure of said wax formed during said first cooling is not broken down during said further cooling and said homogeneous blend is formed into a stable edible fat-containing product having the textural characteristics of a margarine-type tablespread.

2. An edible fat-containing product in accordance with claim 1 wherein said polyol fatty acid polyesters are sucrose fatty acid polyesters.

3. An edible fat-containing product in accordance with claim 1 wherein said wax is selected from the group consisting of insect waxes, vegetable waxes, animal waxes, petroleum waxes and synthetic waxes.

4. An edible fat-containing product in accordance with claim 3 wherein said wax is selected from the group consisting of beeswax, candelilla wax, carnauba wax, Japan wax, ouricury wax, jojoba wax and bayberry wax.

5. An edible fat-containing product in accordance with claim 4 wherein said wax is beeswax.

6. An edible fat-containing product in accordance with claim 1 wherein said wax has a melting temperature of at least 100° F.

7. An edible fat-containing product in accordance with claim 1 wherein said wax has a melting temperature in the range of from about 100° F. to about 190° F.

8. A method for producing a stable edible fat-containing product having the textural characteristics of a margarine-type tablespread comprising:
   (a) providing a mixture of an oil phase containing about 92% to about 98.5% of a liquid fat which is liquid at about 60° F. and about 1.5% to about 8.0% of a wax wherein said liquid fat consists of polyol fatty acid polyesters which are selected from the group consisting of sugar fatty acid esters and sugar alcohol fatty acid esters having at least five fatty acid ester groups;
   (b) heating said mixture with agitation to a temperature sufficient to melt said wax and to provide a homogeneous oil phase of said liquid fat and said wax;
   (c) adding an aqueous dispersion to said heated oil phase to form a homogeneous blend, said aqueous dispersion being added at a level of one part of said aqueous dispersion to from about 3 parts to about 5 parts of said oil phase;
   (d) first cooling said homogeneous blend under low shear agitation to a temperature intermediate between ambient temperature and the melting temperature of said wax; and
   (e) further cooling the homogeneous blend to refrigeration temperature under quiescent conditions;
   whereby the structure of said wax formed during said first cooling is not broken down during said further cooling and said homogeneous blend is formed into a stable edible fat-containing product having the textural characteristics of a margarine-type tablespread.

9. A method in accordance with claim 8 wherein said polyol fatty acid polyesters are sucrose fatty acid polyesters.

10. A method in accordance with claim 8 wherein said wax is selected from the group consisting of insect waxes, vegetable waxes, animal waxes, petroleum waxes and synthetic waxes.

11. A method in accordance with claim 10 wherein said wax is selected from the group consisting of beeswax, candilla wax and carnauba wax, Japan wax, ouricury wax, jojoba wax and bayberry wax.

12. A method in accordance with claim 11 wherein said wax is beeswax.

13. A method in accordance with claim 8 wherein said wax has a melting temperature of at least 100° F.

14. A method in accordance with claim 8 wherein said wax has a melting temperature in the range of from about 100° F. to about 190° F.

15. An edible fat-containing product having the textural characteristics of a margarine-type tablespread which is a stable homogeneous blend comprising an aqueous dispersion and an oil phase wherein said oil phase comprises about 92% to about 98.5% of a liquid fat selected from the group consisting of triglyceride fats and polyol fatty acid polyesters which are liquid at about 60° F. and about 1.5% to about 8% of a wax, and wherein the product further comprises an oil-in-water viscous dressing whose oil phase comprises a sucrose fatty acid polyester which is a solid at room temperature, further wherein said edible fat-containing product is prepared by a process comprising:
   (a) providing a mixture of said liquid fat and said wax, said mixture having from about 92% to about 98.5% of said liquid fat and from about 1.5% to about 8% of said wax;

(b) heating said mixture with agitation to a temperature sufficient to melt said wax and to provide a homogeneous oil phase of said liquid fat and said wax;

(c) adding said aqueous dispersion to said heated oil phase, said aqueous dispersion being added at a level of one part of said aqueous dispersion to from about 3 parts to about 5 parts of said oil phase to form a homogeneous blend;

(d) first cooling said homogeneous blend under low shear agitation to a temperature intermediate between ambient temperature and the melting temperature of said wax wherein said viscous dressing is added to the blend during this step; and (e) further cooling the homogeneous blend to refrigeration temperature under quiescent conditions;

whereby the structure of said wax formed during said first cooling is not broken down during said further cooling and said homogeneous blend is formed into a stable edible fat-containing product having the textural characteristics of a margarine-type tablespread, and thereby yielding an edible fat-containing product having added opacity.

16. An edible fat-containing product as described in claim 15 wherein said wax is selected from the group consisting of insect waxes, vegetable waxes, animal waxes, petroleum waxes and synthetic waxes.

17. An edible fat-containing product as described in claim 16 wherein said wax is selected from the group consisting of beeswax, candelilla wax, carnauba wax, Japan wax, ourcury wax, jojoba wax and bayberry wax.

18. An edible fat-containing product as described in claim 17 wherein said wax is beeswax.

19. An edible fat-containing product as described in claim 15 wherein said wax has a melting temperature of at least 100° F.

20. An edible fat-containing product as described in claim 15 wherein said wax has a melting temperature in the range of from about 100° F. to about 190° F.

21. A method for producing an edible fat-containing product having the textural characteristics of a margarine-type tablespread comprising:

(a) providing a mixture of an oil phase containing about 92% to about 98.5% of a liquid fat selected from the group consisting of triglyceride fats and polyol fat acid polyesters which are liquid at about 60° F. and about 1.5% to about 8.0% of a wax;

(b) heating said mixture with agitation to a temperature sufficient to melt said wax and to provide a homogeneous oil phase of said liquid fat and said wax;

(c) adding an aqueous dispersion to said heated oil phase to form a homogeneous blend, said aqueous dispersion being added at a level of one part of said aqueous dispersion to from about 3 parts to about 5 parts of said oil phase;

(d) first cooling said homogeneous blend under low shear agitation to a temperature intermediate between ambient temperature and the melting temperature of said wax, and adding to said homogeneous blend under low shear agitation an oil-in-water viscous dressing whose oil phase comprises a sucrose fatty acid polyester which is a solid at room temperature; and (e) further cooling the homogeneous blend to refrigeration temperature under quiescent conditions;

whereby the structure of said wax formed during said first cooling is not broken down during said further cooling and said homogeneous blend is formed into a stable edible fat-containing product having the textural characteristics of a margarine-type tablespread, the method furthermore yielding an edible fat-containing product having added opacity.

22. A method as described in claim 21 wherein said wax is selected from the group consisting of insect waxes, vegetable waxes, animal waxes, petroleum waxes and synthetic waxes.

23. A method as described in claim 22 wherein said wax is selected from the group consisting of beeswax, candelilla wax, carnauba wax, Japan wax, ourcury wax, jojoba wax and bayberry wax.

24. A method as described in claim 23 wherein said wax is beeswax.

25. A method as described in claim 21 wherein said wax has a melting temperature of at least 100° F.

26. A method as described in claim 21 wherein said wax has a melting temperature in the range of from about 100° F. to about 190° F.

* * * * *

UNITED STATES PATENT AND TRADEMARK OFFICE
CERTIFICATE OF CORRECTION

PATENT NO. : 6,022,578
DATED : February 8, 2000
INVENTOR(S) : Miller

It is certified that error appears in the above-identified patent and that said Letters Patent is hereby corrected as shown below:

Column 10,
Line 12, after "wax" insert -- , --.
Line 44, change "candilla" to -- candelilla --.

Column 12,
Line 15, change "," to -- ; --.

Signed and Sealed this

Eleventh Day of June, 2002

Attest:

JAMES E. ROGAN
Attesting Officer        Director of the United States Patent and Trademark Office